United States Patent Office.

JOHANN JAKOB BRACK, OF BASLE, SWITZERLAND, ASSIGNOR TO L. DURAND, HUGUENIN & CO., OF SAME PLACE, ST. FONS, FRANCE, AND HÜNINGEN, GERMANY.

SUBSTANTIVE COTTON DYE.

SPECIFICATION forming part of Letters Patent No. 542,073, dated July 2, 1895.

Application filed December 12, 1894. Serial No. 531,576. (Specimens.)

*To all whom it may concern:*

Be it known that I, JOHANN JAKOB BRACK, a citizen of the Swiss Republic, residing at Basle, Switzerland, have invented certain new and useful Improvements in the Manufacture of Substantive Cotton Dyes, of which the following is a specification.

This invention relates to the manufacture of new substantive cotton dyes, which are obtained by combining amidonaphtolsulfo acids with the diazo derivative of the base obtained by the condensation of formaldehyde with dianisidin in the presence of an excess of hydrochloric acid in a dilute aqueous solution.

I. *Production of the base.*—Forty-nine kilograms of dianisidin are dissolved in seven hundred liters of water and one hundred and twenty kilograms of hydrochloric acid of thirty per cent. strength. The solution thus prepared is heated to ebullition, and to it are added eight kilograms of a forty per cent. solution of formaldehyde. The mixture is then boiled for two hours, during which time the whole of the dianisidin will have entered into reaction. The reaction is pretty violent, so that during the addition of the formaldehyde the heating must be interrupted. The solution suddenly assumes a brown-yellow color. The base formed is precipitated from its solution with ammonia as a gray resinous mass. This base begins to liquefy at 55° centigrade and constitutes at 65° centigrade a viscous resinous mass. It is sparingly soluble in cold alcohol and cold benzene, while on heating the greatest part dissolves after some time in these solvents. Its sulfate or chlorhydrate is easily soluble in water and alcohol, yet from its moderately concentrated aqueous solutions a part of the chlorhydrate of the base deposits as a gelatinous mass.

II. *Production of the dye.*—The solution of the hydrochlorate of the base, obtained in the above described manner by means of 4.9 kilograms of dianisidin, twelve kilograms of hydrochloric acid of 30° Baumé, and 0.8 kilograms of formaldehyde of forty per cent., is diazotised in the known way with 2.1 kilograms of sodium nitrite. The resulting diazo compound is poured into a solution containing 10.2 kilograms of amidonaphtoldisulfoacid 1.3.6.8 and of 8.5 kilograms of carbonate of soda. After a short time there is formed the new coloring-matter in form of a precipitate, which, when filtered and dried, appears as a black-brown powder with a metallic luster and dyes unmordanted cotton in alkaline bath a greenish-blue tint. The solution of the coloring-matter in concentrated sulfuric acid is green-blue. An addition of water produces a violet precipitate. The coloring-matter dissolves in water with blue coloration, while it is sparingly soluble in alcohol.

If in the manufacture of this coloring matter I employ 7.2 kilograms of amidonaphtol-monosulfo acid—for example, amidonaphtol-monosulfo acid 2.6.8—in the place of the 10.2 kilograms of amidonaphtoldisulfo acid, I obtain a similar coloring-matter, which dyes unmordanted cotton from blue-gray to blue-black.

Having thus described my invention, I claim—

1. The herein described improvement in the manufacture of substantive cotton dyes, which consists in combining an amidonaphtolsulfo acid with the diazo-derivative of the base derived from the condensation of formaldehyde with dianisidin, substantially as set forth.

2. The herein described substantive cotton dye derived from amidonaphtoldisulfo acid 1.3.6.8 and the diazo-derivative of the base produced by the condensation of formaldehyde with dianisidin, said coloring matter being in the form of a black-brown powder, which dies unmordanted cotton greenish-blue and being soluble in water with a blue coloration, slightly soluble in alcohol, soluble in concentrated sulfuric acid with a blue color, from which solution on diluting with water a violet precipitate is thrown down.

In witness whereof I have hereunto signed my name in the presence of two subscribing witnesses.

JOHANN JAKOB BRACK.

Witnesses:
GEORGE GIFFORD,
AMAND RITTER.